(12) United States Patent
Dallman

(10) Patent No.: US 8,763,263 B2
(45) Date of Patent: *Jul. 1, 2014

(54) WRITING GUIDE

(76) Inventor: Brent Dallman, Indianapolis, IN (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/316,385

(22) Filed: Dec. 9, 2011

(65) Prior Publication Data

US 2013/0145635 A1 Jun. 13, 2013

(51) Int. Cl.
*G01C 15/00* (2006.01)

(52) U.S. Cl.
USPC .................. 33/286; 33/18.2; 33/566

(58) Field of Classification Search
USPC ........ 33/18.1, 18.2, 41.1, 41.2, 41.4, 42, 286, 33/485, 492, 566
See application file for complete search history.

(56) References Cited

U.S. PATENT DOCUMENTS

| | | | | |
|---|---|---|---|---|
| 3,875,396 A * | 4/1975 | Webb | ............... | 362/99 |
| 4,679,328 A * | 7/1987 | Saad | ............... | 33/447 |
| 5,050,306 A * | 9/1991 | Renaud | ............... | 33/41.1 |
| 5,337,484 A * | 8/1994 | Cardon | ............... | 33/41.2 |
| 5,823,500 A * | 10/1998 | La Coste | ............... | 248/444 |
| 6,782,629 B2 * | 8/2004 | Jimenez et al. | ............... | 33/483 |
| 7,219,437 B2 * | 5/2007 | Dallman | ............... | 33/286 |
| 7,469,480 B2 * | 12/2008 | Nottingham et al. | ............... | 33/286 |
| 7,484,304 B2 * | 2/2009 | Campagna et al. | ............... | 33/286 |
| 8,413,345 B2 * | 4/2013 | Lane | ............... | 33/501 |
| 2006/0168828 A1 * | 8/2006 | Dallman | ............... | 33/286 |
| 2006/0168830 A1 * | 8/2006 | Dallman | ............... | 33/286 |
| 2007/0175882 A1 * | 8/2007 | Dallman | ............... | 219/222 |

\* cited by examiner

*Primary Examiner* — G. Bradley Bennett

(74) *Attorney, Agent, or Firm* — Keith Swedo; Bingham Greenebaum Doll LLP

(57) ABSTRACT

The provided writer guide facilitates the operator in creating a craft project or scrap book page with the desired aesthetic effect. The writer guide emits a laser beam guide line across a medium in a position desirable to the operator. The operator may utilize the guide line for activities that may include but are not limited to writing, printing, scripting, placing, designing, creating, and positioning of components to achieve an aesthetically pleasing product.

20 Claims, 12 Drawing Sheets

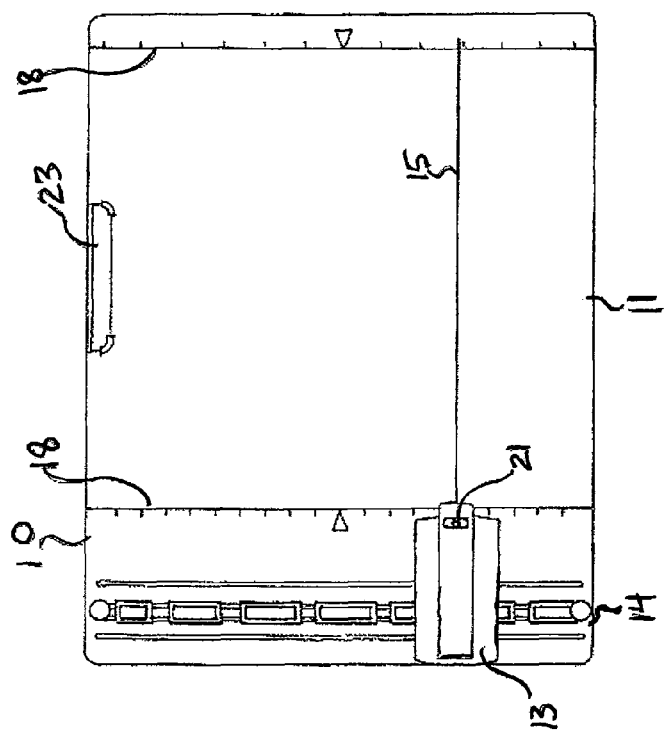
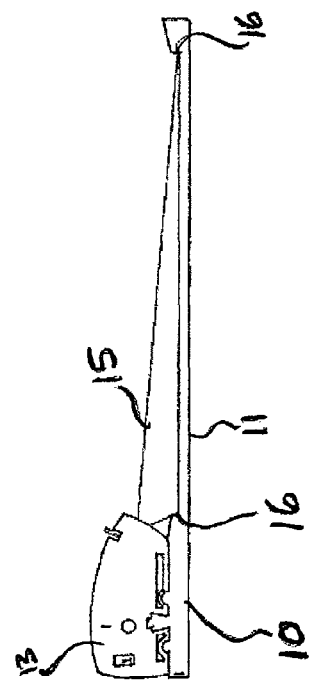
FIG. 1A
FIG. 1B

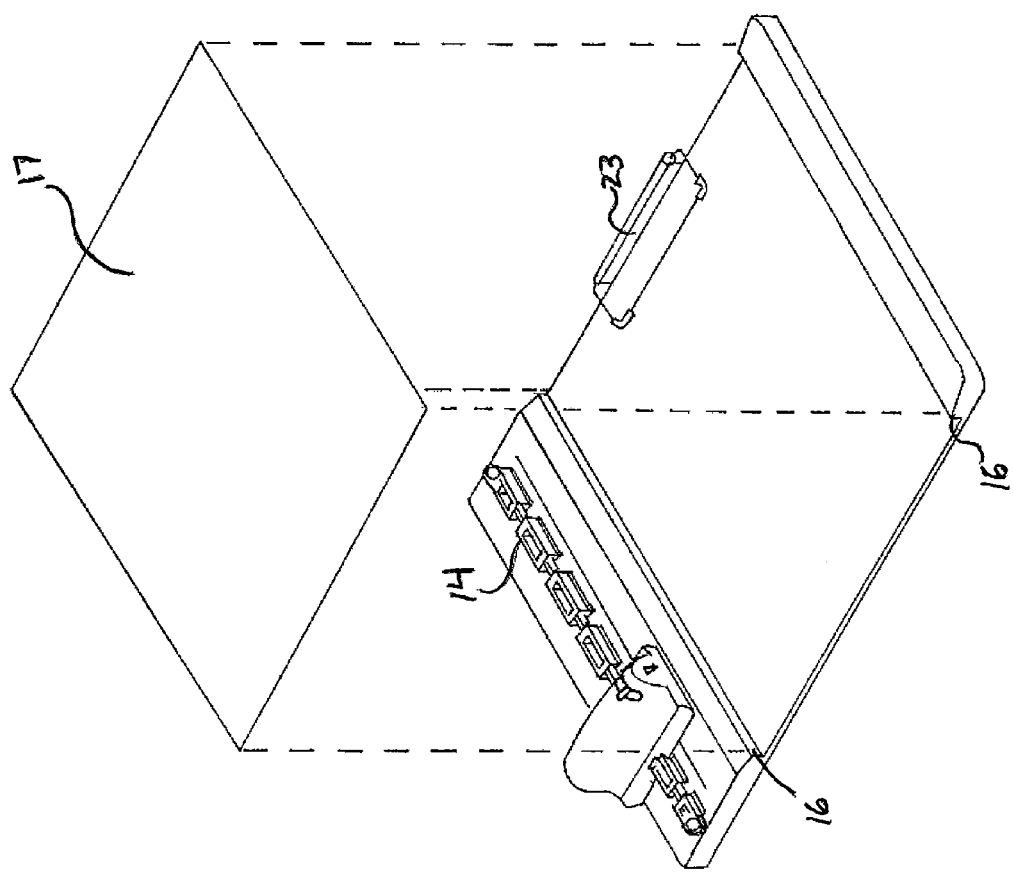

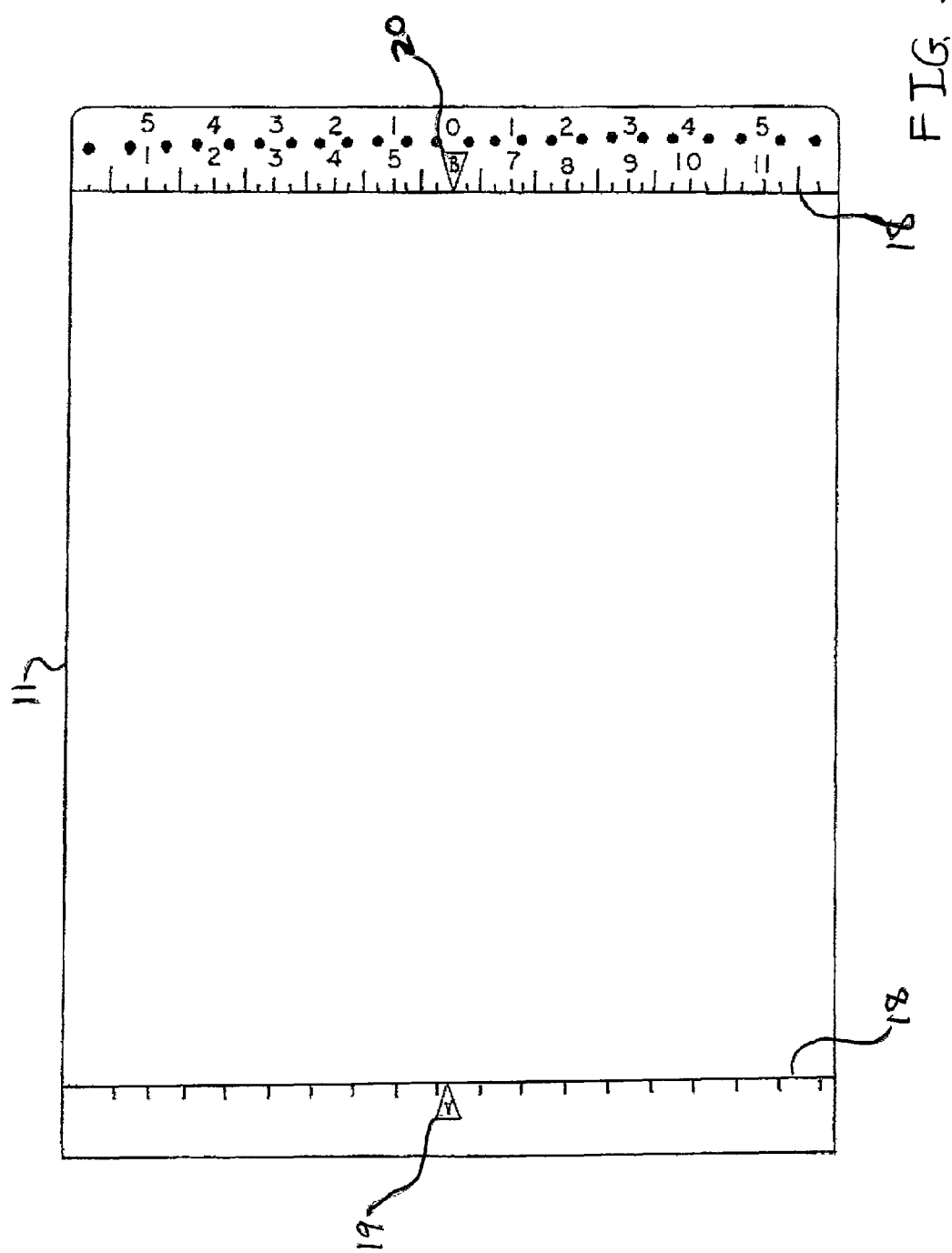

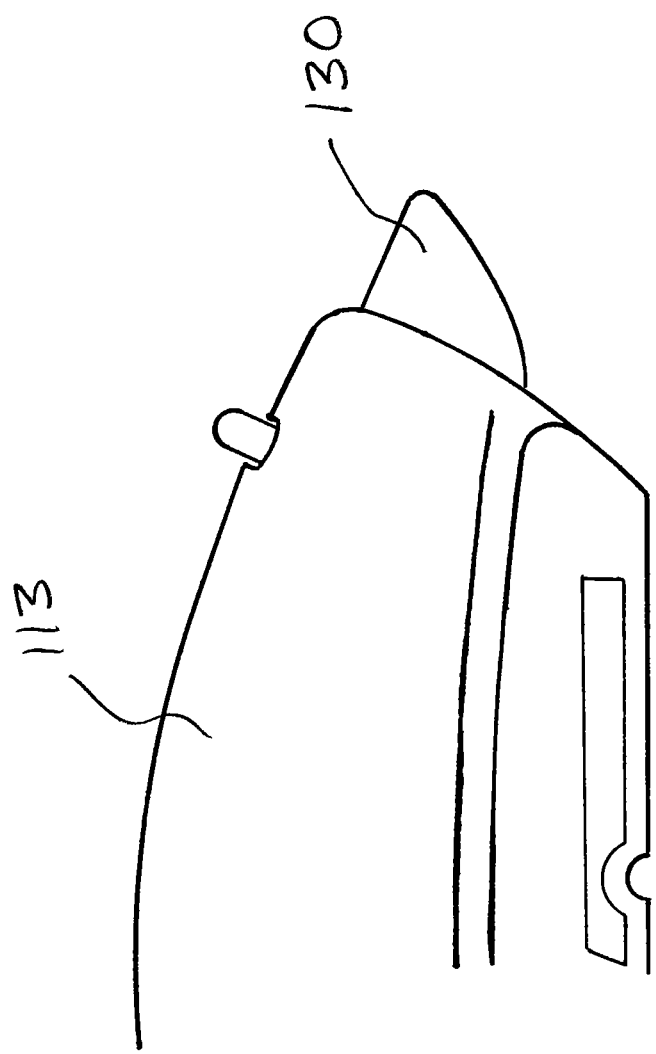

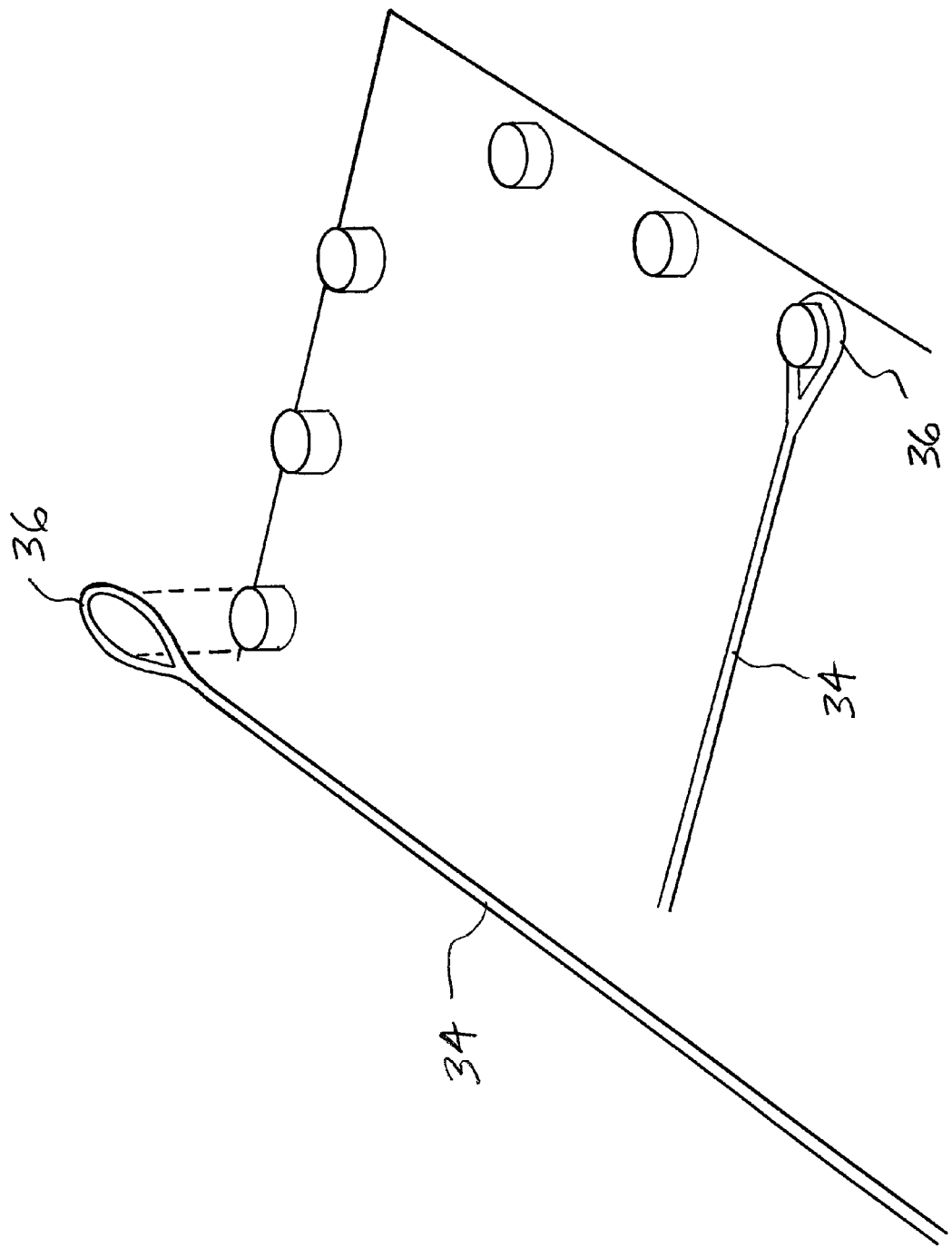

WRITING GUIDE

FIELD OF THE INVENTION

The present application relates to art supplies and more particularly to devices for designing layouts for generally planar medium.

BACKGROUND OF THE INVENTION

A scrapbook is a collection of scrapbook pages, each of which is a unique collection of materials such as but not limited to photographs, paper crafts and journaling. All of the components of a scrapbook page are arranged in an aesthetically pleasing manner. The components are typically affixed in place and the assembled page is inserted into a scrapbook album. The person making a crafting projects such as a scrapbook page may include information, comments or other writing on the scrapbook page.

The scrapbook business has grown over the past several years. There are a variety of scrapbook specialty items and tools to allow a crafter or scrapbooker to create the desired look or effect. The effort needed to create the desired effect is extensive. One of the later stages in creating a craft project or scrapbook page is the inclusion of hand-written or printed comments. Improper placement of such written or printed comments detracts from the aesthetic appearance of the final product and may result in a loss of time or resources. Templates for writing may shift or slide resulting in improper placement. Also, templates for writing are limited by the shape of the template reducing the ability of the scrapbooker to create the desired effect.

SUMMARY OF THE INVENTION

Scrap booking and crafting projects utilize numerous types and sizes of materials. Frequently there is a desire to include handwriting on a scrap book page or crafting project. The artistic nature of scrap-booking and the common use of multiple materials contribute to the challenge of neatly writing on a scrap-book page. The current application may facilitate handwriting on a scrap-book page or other planar crafting project.

A writer guide comprising a paper channel and an adjustable laser are provided. In an embodiment, the writer guide comprises a paper channel with a work surface and at least two vertical walls. In an embodiment of the writer guide, the paper channel accommodates a medium measuring twelve inches in at least one dimension. In an embodiment of the writer guide, the paper guide accommodates a medium measuring twelve inches by twelve inches. In various embodiments, the paper channel comprises a measurement indicator. Measurement indicators of particular interest may include, but are not limited to, standard calligraphy rulers, metric rulers, and English rulers. In an aspect, a measurement indicator may indicate provide intervals of predetermined length. Predetermined lengths of intervals may include, but are not limited to, ¼", ½", ¾" and 1" intervals.

In an embodiment, the paper channel comprises a paper clamping system selected from the group comprising a paper clip and a paper clamp. The paper clamping system may further comprise at least one positionable band. In an embodiment, the paper channel further comprises a retaining system for a positionable band. In an embodiment the paper channel comprises a first calibration point opposite a second calibration point.

In an embodiment, the laser of a claimed writer guide may be manually calibrated. In an embodiment of the writer guide, the laser emits a beam that appears as a line on the work surface of the paper channel. In an embodiment the laser emits a planar triangular beam. In an embodiment the laser is mounted to a trolley. In an embodiment the trolley is positioned on a rail system comprising a center rail, a first side rail parallel to the center rail and adjacent to the center rail, and a second side rail parallel to the center rail and adjacent to the center rail. In various embodiments, the location of the trolley mounted laser system is adjustable.

In an embodiment, a device that displays an adjustable line on a planar surface to facilitate handwriting or linear placement of objects is provided.

BRIEF DESCRIPTION OF THE DRAWINGS

FIG. 1A shows a top plan view of a writer guide in accordance with one embodiment of the present application; and FIG. 1B shows the guide and laser beam from a side view.

FIG. 2 shows a standard 12"×12" medium that would fit snugly within the paper channel and on the work surface in accordance with one embodiment of the present application.

FIG. 3 generally shows embodiments of two measurement indicators, a first calibration point and a second calibration point.

FIG. 11 shows a side view of another embodiment of the trolley.

FIG. 12 shows a perspective view of another embodiment of a work surface of the invention for accommodating bands with looped ends.

DETAILED DESCRIPTION OF THE INVENTION

Figure 4:
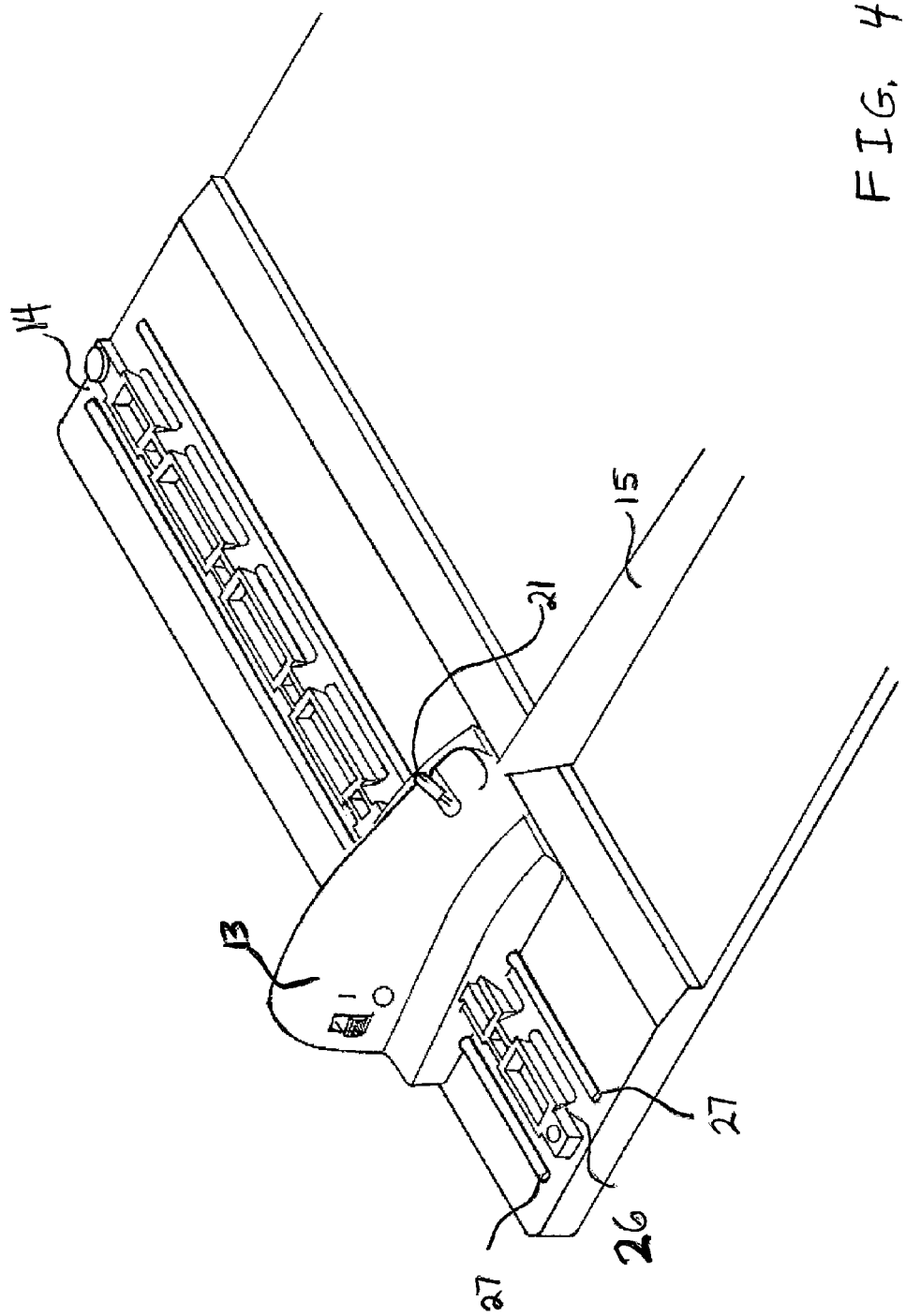
FIG. 4 shows a trolley mounted adjustable laser positioned on a rail system comprising a center rail, a first side rail and a second side rail and a section of a paper channel of a writer guide in accordance with one embodiment of the present application.

In reference to the drawings, the same reference numerals identify the same elements of structure in each of the several figures.

Figure 9:
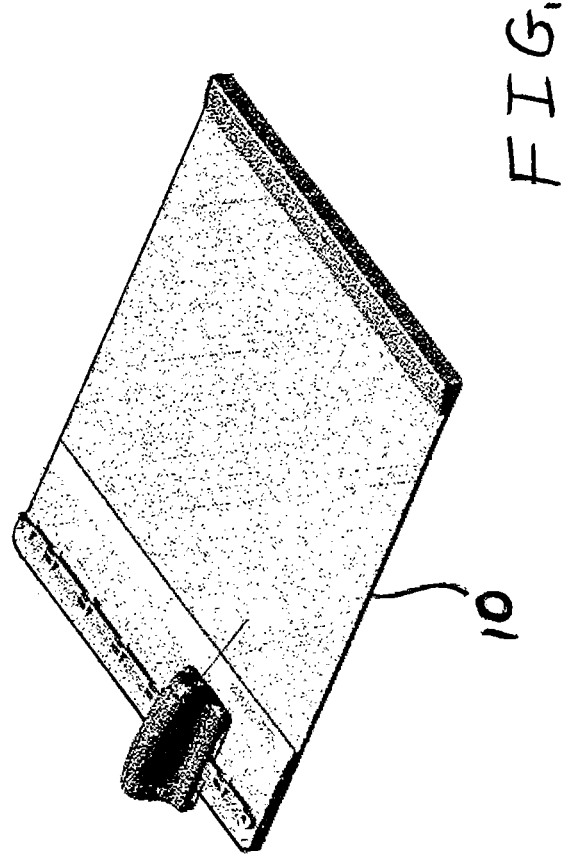
FIG. 9 shows a writer guide in accordance with an embodiment of the application.

The present application provides a writer guide device 10. Examples of a writer guide device are generally illustrated in FIGS. 1, 2 and 9. A writer guide device 10 comprises a paper channel 11 and an adjustable laser 22. In an embodiment the adjustable laser is mounted to a trolley 13 that slides, glides, rides, moves, or travels on a rail system 14. Movement of the trolley allows the laser to be adjustably positioned such that the laser beam 15 emitted by the laser extends across the paper channel. When a medium is positioned within the paper channel the laser beam extends across the medium. The laser may also be manually calibrated to alter the appearance of the laser beam. In various aspects, the laser beam appears as a region, preferably a band, more preferably a line across the paper channel when viewed from above the device. When a medium is positioned with the paper channel, a well-calibrated laser beam appears as a line across a medium positioned within the paper channel. FIG. 1, panel B shows a side view of a writer guide device and laser beam. The laser may emit a planar triangular beam 15 that extends across the paper channel; when viewed from above the device the beam may appear as a line.

In an embodiment, the paper channel comprises a work surface and at least two vertical walls 16 as depicted in FIG. 2. "Vertical wall" may encompass a wall, lip, edge, bumper, guide, rim or support. The work surface is generally planar and firm. Generally the vertical walls oppose each other and are of sufficient depth to accommodate a variety of media including but not limited to paper, scrap-booking paper, cardstock, cardboard, poster-board, thin sheets of wood, foils, metal sheets, and cloth. Media suitable for use with the claimed device are generally planar mediums 17 including, but not limited to, paper, cloth, poster-board, cardstock, thin plywood sheets, thin wood sheets, greeting cards, stationery, letters, envelopes, photographic paper, foils and scrap-booking pages. While mediums suitable for use with the claimed device are generally planar, it is recognized that such mediums may include one or more layers of materials and that the surface level of the medium may vary. In an embodiment of the device, the distance between the vertical walls is within the range of 1" to 13", 2" to 12.5", or 3" to 12.5", particularly the range of 4" to 12.5", 5" to 12.5", or 6" to 12.5", more particularly the range of 7" to 12.5", 8" to 12.5", or 9" to 12.5", yet more particularly the range of 8" to 12.5", 9" to 12.5", 10" to 12.5", 11" to 12.5", and still more particularly approximately 12". In an aspect of the device, the spacing between the vertical walls is adjustable.

In various embodiments of the device, the paper channel may further comprise a measurement indicator 18. In the embodiment of the paper channel 11 depicted in FIG. 3, the paper channel comprises two measurement indicators 18. A measurement indicator provides intervals of predetermined length. An operator of the device may utilize such predetermined intervals to facilitate activities such as, but not limited to, placing, spacing, arranging, locating, designing and configuring the layout of letters, objects, shapes, writing, embellishments, photographs, pictures, stickers or other aspects of the medium's appearance. Any predetermined interval length may be utilized in the device. Predetermined interval lengths may include, but are not limited to, ¼", ½", ¾", and 1" length intervals. A measurement indicator suitable for use in the device may include, but is not limited to, a standard calligraphy ruler, metric ruler and an English ruler. In an embodiment of the device, the measurement indicator is located on the horizontal top surface of a vertical wall, on the side of the vertical wall, or on the work surface of the paper channel. In various embodiments, the device may comprise multiple measurement indicators that may provide intervals of the same or different predetermined lengths.

Figure 6:
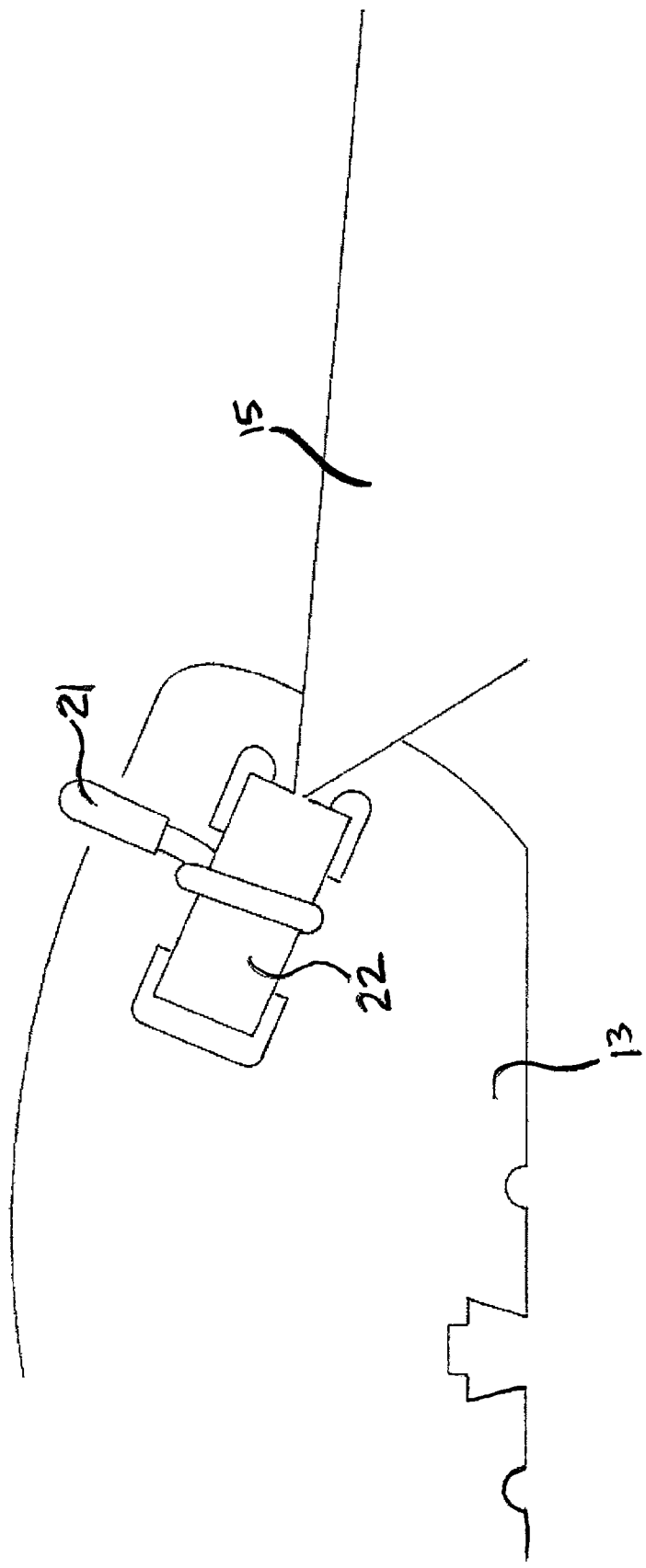
FIG. 6 shows a side view of a trolley mounted adjustable laser and laser beam in accordance with an embodiment of the present application.

In an embodiment of the device, the paper channel may further comprise a first calibration point 19 opposite a second calibration point 20. FIG. 3 depicts an embodiment of a first calibration point and a second calibration point. The adjustable laser may be manually calibrated. In an aspect of the device the first and second calibration points facilitate calibration of the laser, such that an optimally calibrated laser emits a laser beam that appear as a line across the paper channel when viewed from above the device. In an aspect of the device, the laser may be manually calibrated by rotating the laser with a calibration knob 21. Calibration knobs may include, but are not limited to, spring arms, knobs, springs, buttons, spindles, pins, levers, louvers, wire, coil or other devices that rotate the laser 22 to alter the appearance of the laser beam 15 emitted by the laser. An embodiment showing the calibration knob 21 protruding from the trolley 13 and laser 22 housed within the trolley 13 and emitting a laser beam 15 is depicted in FIG. 6.

Figure 7:
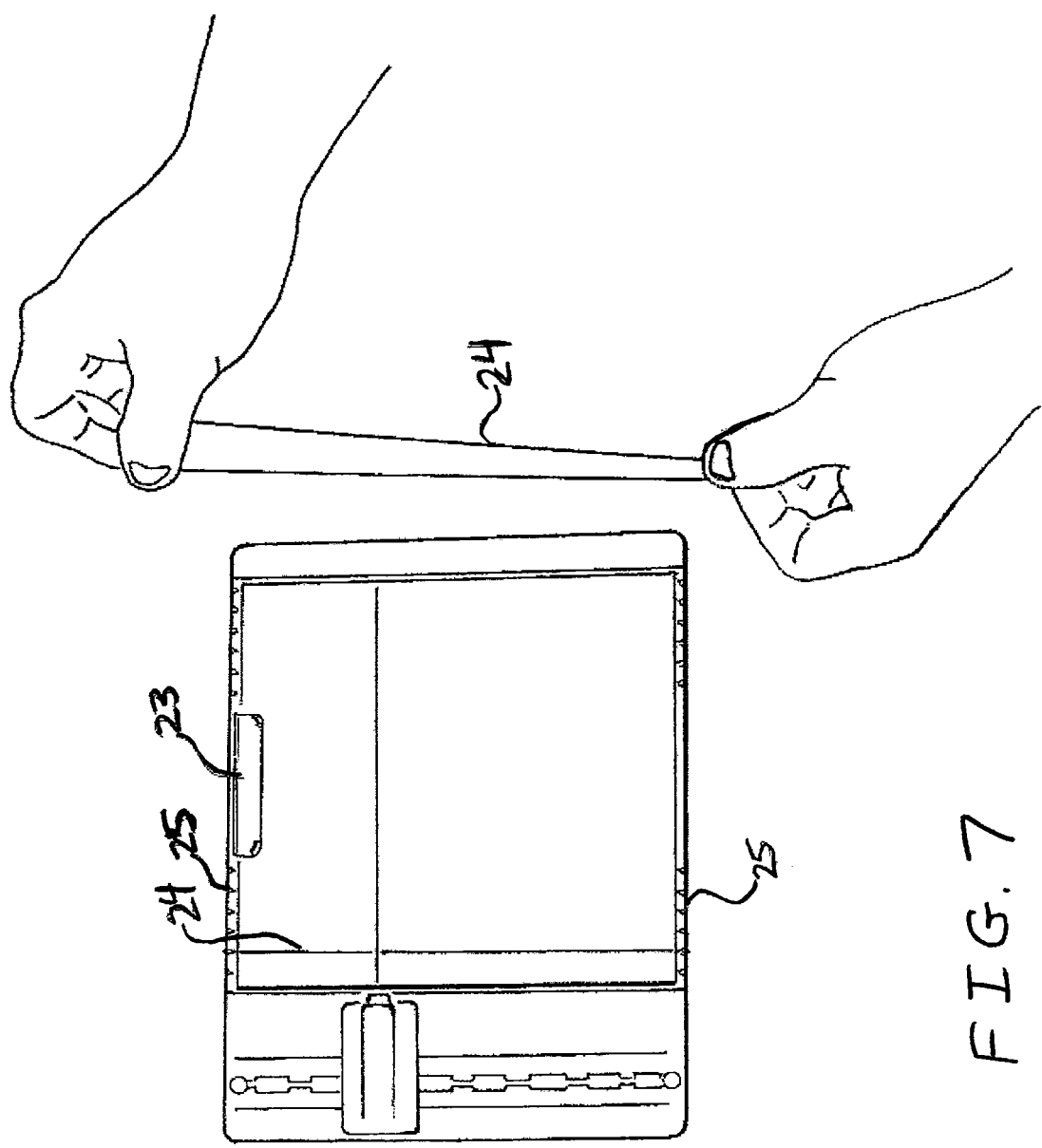
FIG. 7 shows a view from above of a writer guide in accordance with the present application showing a paper clamping system, a retaining system and a first positionable band positioned in the retaining system and a second positionable band prior to positioning in the retaining system.

In an embodiment of the device the paper channel comprises a paper clamping system 23. A paper clamping system may anchor, stabilize, secure, hold, clamp, grasp, or lock the medium 17 in the device. A paper clamping system may be selected from the group including but not limited to paper clips, paper clamps, clips, clamps, bands, straps, binder clips, tension devices, and spring tension devices. A paper clamping system may further comprise at least one positionable band 24. Examples of a type of positionable band are depicted in FIG. 7. Positionable bands may include, but are not limited to, rubber bands, elastic bands, rubber straps, elastic straps, strings, and flexible wires. A positionable band may be removable from the device or may be attached to the device. Without being limited by mechanism, a positionable band may provide the operator with an additional guide for placing, spacing, designing, planning, creating, arranging, or locating the layout of the final product, may divide the medium into sections, and may hold, secure, or align the medium 17 in the device. Factors that may contribute to the operator's decision to use or place a positionable band include, but are not limited to, a desire to envision margins or sections and size of the medium, particularly medium that do not fill the work surface. Positionable bands may be placed parallel to the vertical walls or may be placed diagonally.

Figure 8:
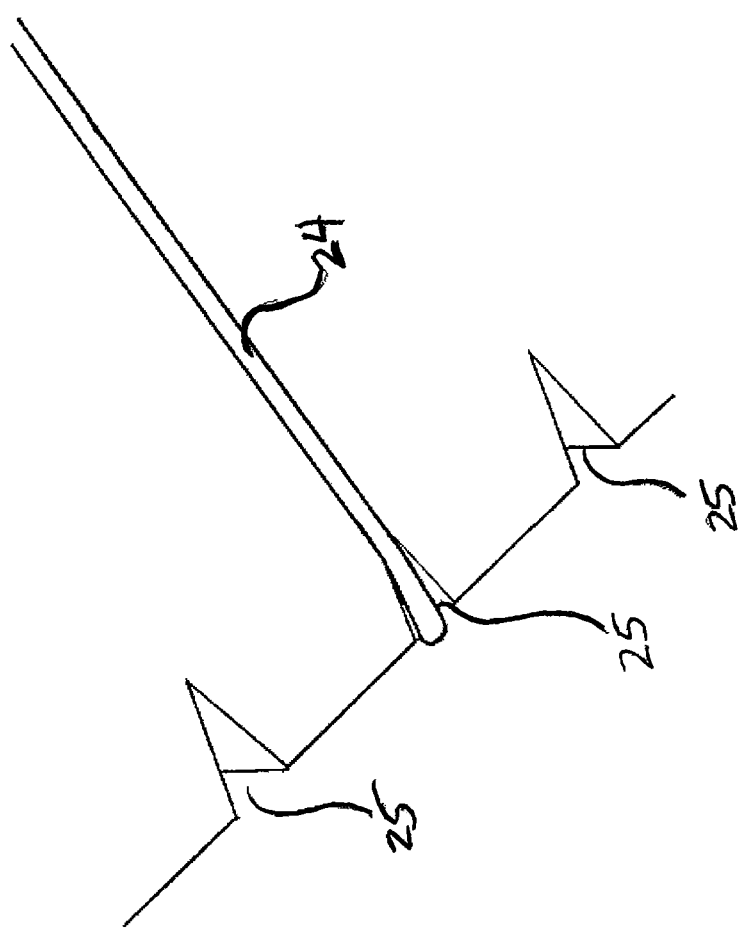
FIG. 8 shows a positionable band positioned in a retaining system in accordance with the present application.

In various embodiments of the device, the paper channel 11 may further comprise a retaining system 25 for a positionable band 24. A retaining system used in a claimed device may include, but is not limited to, a notch, series of notches, pin, knob, holder, clip, screw, nail, hook, clamp or series of such. FIG. 7 shows an embodiment of a retaining system 25 comprised of a series of notches. A further view of an embodiment of a retaining system 25 is shown in FIG. 8. A positionable band 24 is shown retained in a notch in a series of notches in the retaining system 25.

The claimed writer guide device 10 comprises a laser. In an embodiment, the laser 22 is a "trolley mounted laser". A "trolley mounted laser" is intended to encompass a laser or laser diode mounted to, attached to, housed within, encased within, or located on a trolley 13. In an aspect of the device, the trolley is positioned on a rail system 14. In an embodiment the rail system comprises a rail. In various embodiments of the device, the rail system comprises a center rail 26, a first side rail 27 parallel to and adjacent to the center rail, and a second side rail 27 parallel to and adjacent to the center rail. Various embodiments of such a rail system are depicted in FIGS. 1, 2, and 4. In an embodiment of the rail system, a rail may be a dove-tailed linear track.

Figure 5:
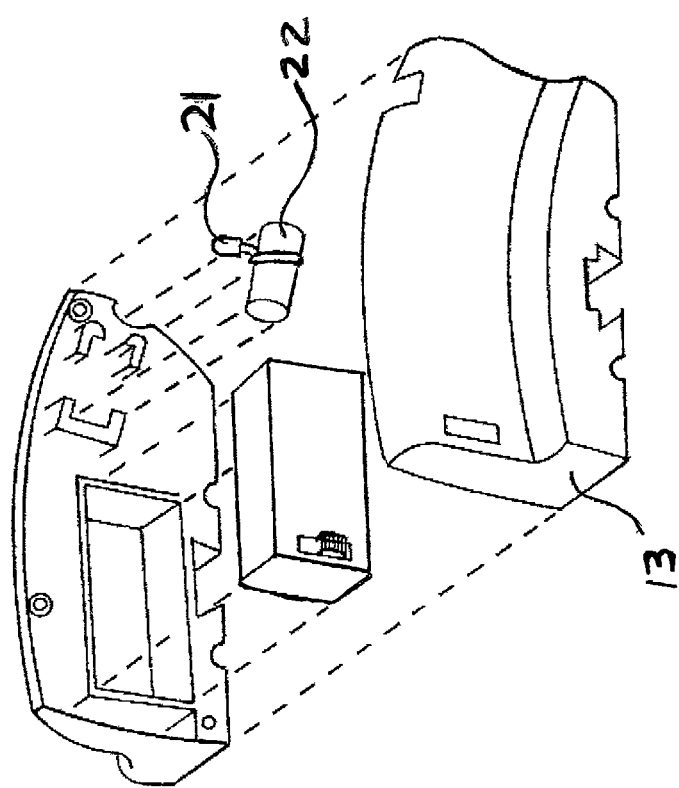
FIG. 5 shows components of a trolley mounted laser in accordance with an embodiment of the present application.

An interior view of an embodiment of a trolley mounted laser is depicted in FIG. 5. In this embodiment, the laser 22 is housed within the trolley 13. A calibration knob 21 protrudes from the trolley 13. The trolley may further comprise a power supply 30 and a power switch 31.

Without being limited by mechanism, movement of the trolley along the rail system allows the laser to be adjustable so as to emit a laser beam across the work surface of the paper channel and across any medium that may be placed on the work surface of the paper channel. In various embodiments, the trolley glides, slides, moves, or travels to a location of interest along the rail system. When activated, the laser emits a laser beam across the paper channel. A well-calibrated laser emits a laser beam that appears as a line on a medium placed within the paper channel or on the paper channel itself. The operator of the device may then write, position, place, put, design, create, adorn, affix various artistic aspects of the scrapbook page or crafting project in an aesthetically desirable layout. An embodiment of the device provides a temporary guide line in the form of a laser beam on the medium in the paper channel that facilitates writing or printing of letters, numbers or words on the medium.

Figure 10:
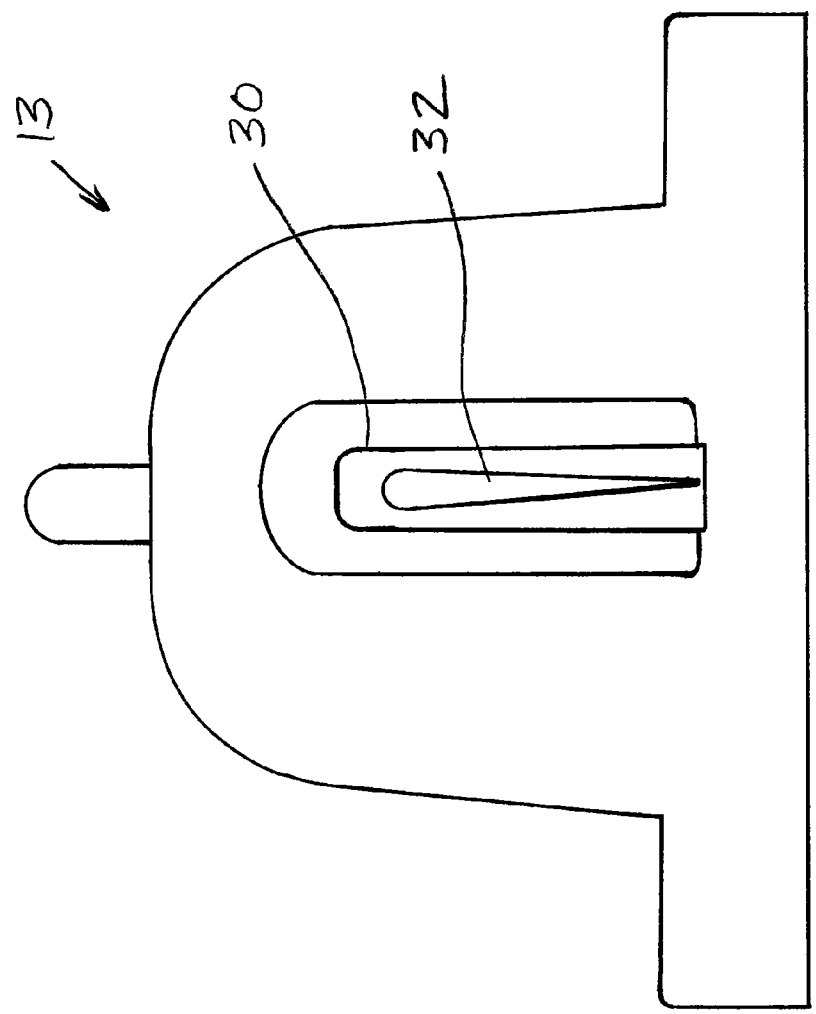
FIG. 10 shows a front view of the trolley.

Trolley 13 may include a hood 30 (FIG. 10) having a slot 32. The open slot 32 allows light to pass to the work surface. The slot has a tear drop shape that progressively narrows near the bottom (closer to the board). This feature limits flooding of light because the light source is closer to the light output. The slot makes the line appear consistent in width and in light density. The end result is a more consistent beam of light.

Another embodiment of a trolley 113 (FIG. 11) may include an additional hood 130 that limits and defines the beam of light on the work surface.

Yet another embodiment (FIG. 12) includes loop bands 34 (rubber bands with loops 36 on opposite ends) and posts 38. Posts 38 can be located not only along the top and bottom edges of the work surface but along all four sides of the work surface. This enables the bands to be located only above the work surface and not wrap around the back of the work surface. Thus, the trolly can slide freely on its rail. The bands can aid the artist in creating margins or shapes like rectangles, triangles, etc. The line producing linear gauge is combined with multiple margins and shapes in a new and novel way.

All publications, patents, and patent applications mentioned in the specification are indicative of the level of those skilled in the art to which this invention pertains. All publications, patents, and patent applications are herein incorporated by reference to the same extent as if each individual publication or patent application was specifically and individually incorporated by reference.

Although the foregoing invention has been described in some detail by way of illustration and example for purposes of clarity of understanding, it will be obvious that certain changes and modifications may be practiced within the scope of the appended claims.

That which is claimed:

1. A writer guide comprising:
   a base including a work surface;
   a vertical wall disposed adjacent to an edge of the base, the vertical wall and the work surface defining a paper channel; and
   a laser associated with the vertical wall.

2. The writer guide of claim 1 wherein said paper channel is sized to accommodate a medium approximately 12 inches in width.

3. The writer guide of claim 1 wherein said paper channel is sized to accommodate an approximately 12 inch by 12 inch medium.

4. The writer guide of claim 1 further comprising a measurement indicator associated with the vertical wall.

5. The writer guide of claim 4, wherein said measurement indicator is selected from the group of measurement indicators comprising: standard calligraphy rulers, metric rulers, and English rulers.

6. The writer guide of claim 5, wherein said measurement indicator provides intervals of predetermined length selected from the group of lengths comprising: ¼", ½", ¾", and 1" lengths.

7. The writer guide of claim 1 further comprising a paper clamping system associated with the work surface and selected from the group comprising a paper clip and a paper clamp.

8. The writer guide of claim 1 further comprising at least one positionable band associated with the work surface.

9. The writer guide of claim 8 further comprising a retaining system for said positionable band, the retaining system being associated with the work surface.

10. The writer guide of claim 1, wherein the vertical wall comprises a first vertical wall, the writer guide further comprising:
    a second vertical wall disposed opposite the first vertical wall; and
    a first calibration point associated with the first vertical wall, the first calibration point being disposed opposite a second calibration point associated with the second vertical wall.

11. The writer guide of claim 1, wherein said laser is manually calibratable.

12. The writer guide of claim 1, wherein said laser is configured to emit a beam that appears as a line on the work surface.

13. The writer guide of claim 12, wherein said laser is configured to emit a planar triangular beam.

14. The writer guide of claim 1, wherein said laser is mounted on a trolley such that a location of said laser is adjustable.

15. The writer guide of claim 14, wherein said trolley is positioned on a rail system comprising a first side rail parallel to a center rail and adjacent to said center rail, and a second side rail parallel to said center rail and adjacent to said center rail.

16. The writer guide of claim 1, wherein the base and the vertical wall are integrally formed.

17. The writer guide of claim 9 wherein the retaining system comprises at least one notch in the base.

18. The writer guide of claim 10, wherein the laser includes a calibration knob and is configured to emit a planar triangular beam, the laser being manually calibratable by actuation of the calibration knob until the beam is aligned with the first calibration point and with the second calibration point.

19. The writer guide of claim 10, wherein the base interconnects the first vertical wall and the second vertical wall.

20. The writer guide of claim 10, wherein the base, the first vertical wall and the second vertical wall are integrally formed.

* * * * *